(12) United States Patent
Terunuma et al.

(10) Patent No.: US 6,178,065 B1
(45) Date of Patent: *Jan. 23, 2001

(54) THIN FILM MAGNETIC HEAD AND MANUFACTURING METHOD OF THE HEAD

(75) Inventors: Koichi Terunuma, Tokyo; Yasufumi Uno, Nagano; Tetsuya Mino, Chiba; Koji Matsukuma, Hyogo, all of (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/081,864

(22) Filed: May 21, 1998

(30) Foreign Application Priority Data

May 29, 1997 (JP) .................................................. 9-154361

(51) Int. Cl.[7] ................................. G11B 5/33; G11B 5/31
(52) U.S. Cl. ........................................... 360/126; 360/119
(58) Field of Search ..................................... 360/113, 119, 360/122, 125, 126, 313, 317

(56) References Cited

U.S. PATENT DOCUMENTS

| 5,438,747 | | 8/1995 | Krounbi et al. | 360/113 |
| 5,452,164 | | 9/1995 | Cole et al. | 360/113 |
| 5,751,526 | * | 5/1998 | Schemmel | 360/126 |
| 5,761,014 | * | 6/1998 | Urai et al. | 360/126 |
| 5,774,308 | * | 6/1998 | Ohtsuka et al. | 360/126 |
| 5,805,392 | * | 9/1998 | Mallary et al. | 360/126 |
| 5,916,423 | * | 6/1999 | Westwood | 29/603.01 |

FOREIGN PATENT DOCUMENTS

| 7-220245 | 8/1995 | (JP) . |
| 7-296331 | 11/1995 | (JP) . |

* cited by examiner

*Primary Examiner*—David L. Ometz
(74) *Attorney, Agent, or Firm*—Arent Fox Kintner Plotkin & Kahn, PLLC (57) ABSTRACT

A thin film magnetic head has a recording gap layer made of a nonmagnetic material, lower and upper magnetic pole layers made of a magnetic material, the lower and upper magnetic pole layers sandwiching the recording gap layer, and a magnetic material side layer deposited via a nonmagnetic material side layer on at least a part of a side surface of at least the upper magnetic pole layer.

7 Claims, 6 Drawing Sheets

THIN FILM MAGNETIC HEAD AND MANUFACTURING METHOD OF THE HEAD

FIELD INVENTION

The present invention relates to a thin film magnetic head such as a composite type thin film magnetic head formed by integrating both an inductive recording head part for recoding information on a magnetic medium such as a magnetic disk and a magnetoresistive effect (MR) reproducing head part for reproducing the information, and to a manufacturing method of the head.

DESCRIPTION OF THE RELATED ART

A thin film magnetic recording head has in general a multi-layered structure of a lower magnetic pole layer, a recording gap layer and an upper magnetic pole layer. The recording gap layer is sandwiched between the lower and upper pole layers. Opposed edges in an ABS (Air Bearing Surface) plane of these lower and upper pole layers define a recording track width of the head.

In such a recording head, if lengths of the opposed edges in the ABS plane of the lower and upper poles are significantly different with each other, a great deal of side fringe magnetic flux (leakage flux being leaked from ends of respective edges of the poles and extending in the track width directions) will be produced during recording. Particularly, in the composite type thin film magnetic head with both the inductive recording head part and the MR reproducing head part, since the length of the opposed edge of the lower magnetic pole which also shares a shield layer of the MR head part is inevitably longer than that of the upper magnetic pole, large amounts of side fringe magnetic flux will be necessarily produced.

The side fringe magnetic flux will induce an effective increase of the recording track width so called as "recording effusion". Especially, in the recent recording head with a narrower recording track width due to the demand for higher recording density, this "recording effusion" causes many problems such as for example crosstalk between the adjacent tracks and deletion of magnetic patterns recorded on the adjacent tracks to occur.

In order to reduce the production of "recording effusion" in the composite type thin film magnetic head, there are known technologies in which the ABS shape of the lower magnetic pole is formed as a plane protrusion shape to coincide the length of the edge of the lower pole with the length of the opposed edge in the ABS plane of the upper pole (Japanese patent unexamined publication Nos. 7(1995)-220245, 7(1995)-225917, 7(1995)-262519 and 7(1995)-296331 for example). However, even if the pole shape is formed so that the lengths of the opposed edges in the ABS plane of the lower and upper poles coincide with each other, some side fringe magnetic flux is produced causing the problems of "recording effusion" to still occur.

SUMMARY OF THE INVENTION

It is therefore an object of the present invention to provide a thin film magnetic head and a manufacturing method of the head, whereby effective increase of the recording track width due to side fringe magnetic flux can be substantially prevented.

According to the present invention, a thin film magnetic head has a recording gap layer made of a nonmagnetic material, lower and upper magnetic pole layers made of a magnetic material, the lower and upper magnetic pole layers sandwiching the recording gap layer, and a magnetic material side layer deposited via a nonmagnetic material side layer on at least a part of a side surface of at least the upper magnetic pole layer.

Thus, most of leakage flux produced at both ends of the edge of the upper magnetic pole layer passes through the nonmagnetic material side layer and is applied to the magnetic material side layer. Therefore, the side fringe magnetic flux leaked from the recording head is extremely reduced. As a result, effective increase of the recording track width due to the side fringe magnetic flux can be nearly prevented.

It is preferred that the nonmagnetic material side layer has a thickness thinner than that of the recording gap layer.

It is also preferred that the nonmagnetic material side layer is made of redeposited nonmagnetic material which is used to form the recording gap layer.

It is further preferred that the magnetic material side layer is made of redeposited magnetic material which is used to form the lower magnetic pole layer.

The upper magnetic pole layer may be constituted by a single magnetic material layer, or constituted by a plurality of stacked magnetic material layers.

It is preferred that the upper magnetic pole layer is constituted by a plurality of stacked magnetic material layers, and that the nonmagnetic material side layer is deposited on a side surface of the upper magnetic pole layer via a layer made of redeposited magnetic material which is used to form a partial layer of the upper magnetic pole layer.

According to the present invention, also, a method for manufacturing a thin film magnetic head includes a step of depositing a nonmagnetic material layer for a recording gap layer on a first magnetic layer for a lower magnetic pole layer, a step of forming an upper magnetic pole layer constituted by a second magnetic material layer on the nonmagnetic material layer, and a step of forming the lower magnetic pole layer and the recording gap layer by ion milling to remove a part of the nonmagnetic material layer and a part of the first magnetic material layer so that a part of the removed material of the nonmagnetic material layer and a part of the removed material of the first magnetic material layer are redeposited on a side surface of the upper magnetic pole layer, respectively.

Since the nonmagnetic material side layer and the magnetic material side layer used to greatly reduce the side fringe magnetic flux are made of redeposited materials which are necessarily generated in the ion milling processes for forming the lower magnetic pole layer and the recording gap layer, no additional process is needed for forming this structure. Furthermore, since the redeposited materials are utilized as they are without adding a process for preventing the removed material to redeposit or without adding a process for removing the redeposited material, the manufacturing processes can be simplified.

The upper magnetic pole layer forming step may include a step of forming the upper magnetic pole layer by a single magnetic material layer or by a plurality of stacked magnetic material layers.

According to the present invention furthermore, a method for manufacturing a thin film magnetic head includes a step of depositing a nonmagnetic material layer for a recording gap layer on a first magnetic layer for a lower magnetic pole layer, a step of depositing a second magnetic material layer for a lower part layer of an upper magnetic pole layer on the nonmagnetic layer, a step of forming an upper part layer of the upper magnetic pole layer on the second magnetic material layer, the upper part layer being constituted by a third magnetic material layer, and a step of forming the lower magnetic pole layer, the recording gap layer and the lower part layer of the upper magnetic pole layer by ion milling to remove a part of the second magnetic layer, a part of the nonmagnetic material layer and a part of the first magnetic material layer so that a part of the removed material of the second magnetic material layer, a part of the removed material of the nonmagnetic material layer and a part of the removed material of the first magnetic material layer are redeposited on a side surface of the upper magnetic pole layer, respectively.

It is preferred that the ion milling is executed using a downward beam of ions directed substantially normal to a surface of the nonmagnetic material layer.

Further objects and advantages of the present invention will be apparent from the following description of the preferred embodiments of the invention as illustrated in the accompanying drawings.

DESCRIPTION OF THE PREFERRED EMBODIMENTS

Figure 1:
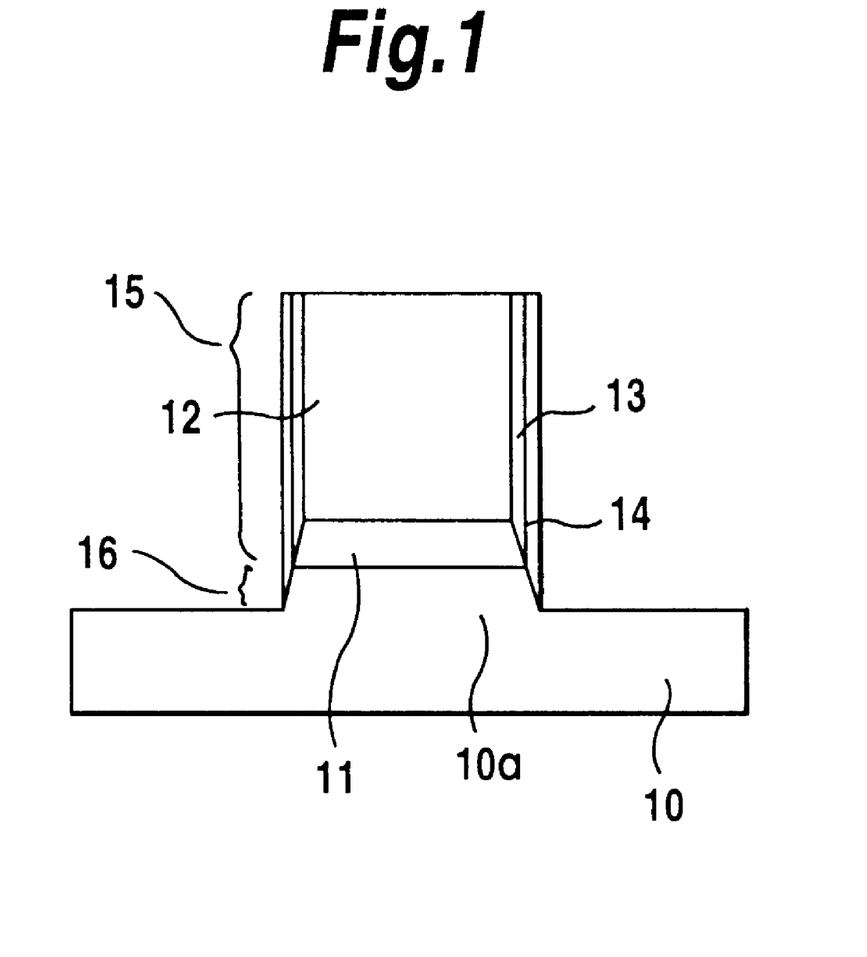
FIG. 1 shows a section viewed from the ABS schematically illustrating a multi-layered structure of a recording head part of a thin film magnetic head in a preferred embodiment according to the present invention.

FIG. 1 schematically illustrates a multi-layered structure of a recording head part of a thin film magnetic head in a preferred embodiment according to the present invention. In this embodiment, the head is a thin film magnetic head with the inductive recording head part and a MR reproducing head part.

In the figure, reference numeral 10 denotes a lower magnetic pole layer of the recording head part which also operates as an upper shield layer of the MR head part, 11 denotes a recording gap layer, and 12 denotes an upper magnetic pole layer, respectively. The lower magnetic pole layer 10 has a shape, in the ABS plane, with a trapezoidal portion 10a protruded from an edge opposed to the upper magnetic pole layer 12 so that the lengths of the opposed edges in the ABS plane of the lower and upper poles are substantially the same or as close to each other as possible.

As shown in FIG. 1, on side surfaces of the upper pole layer 12 and also in some case on side surfaces of the recording gap layer 11, thin nonmagnetic material side layers 13 are formed. On the nonmagnetic material side layers 13 and also in some case on side surfaces of the protruded portion 10a of the lower pole layer 10, magnetic material side layers 14 are formed. The magnetic material side layer 14 has an upper part 15 and a lower part 16.

The nonmagnetic material side layers 13 are made of redeposited nonmagnetic material used to form the recording gap layer 11 and removed by ion milling. Also, the magnetic material side layers 14 are made of redeposited magnetic material used to form the lower pole layer 10 and removed by ion milling. Since the remaining structure of the composite type magnetic head is well known, further illustration is omitted in this specification.

The thickness of the nonmagnetic material side layer 13 is extremely thin in comparison with that of the recording gap layer 11, the thickness of the latter being typically about 0.25 $\mu$m. Thus, most of flux due to the strong magnetic field produced at both ends of the edge of the upper pole layer 12 passes through the nonmagnetic material side layers 13 and 15 applied to the magnetic material side layers 14. Therefore, the side fringe magnetic flux leaked from the recording head part is extremely reduced. As a result, effective increase of the recording track width due to the side fringe magnetic flux can be nearly prevented.

The thickness of each of the magnetic material side layers 14 is preferably 0.05–0.5 $\mu$m, more preferably 0.1–0.3 $\mu$m. If the thickness is less than 0.05 $\mu$m, effect for restraining the side fringe magnetic flux from occurring becomes lower. If the thickness is more than 0.5 $\mu$m, effective magnetic flux passing through the recording gap reduces causing the overwrite performance of the head to deteriorate.

The thickness of each of the nonmagnetic material side layers 13 is preferably ½ of the thickness of the recording gap layer 11 (recording gap length) or less, more preferably ⅓ of the thickness of the layer 11 or less. If this thickness is more than ½ of the thickness of the recording gap layer 11, effect for restraining the side fringe magnetic flux from occurring becomes lower.

Figure 2A:
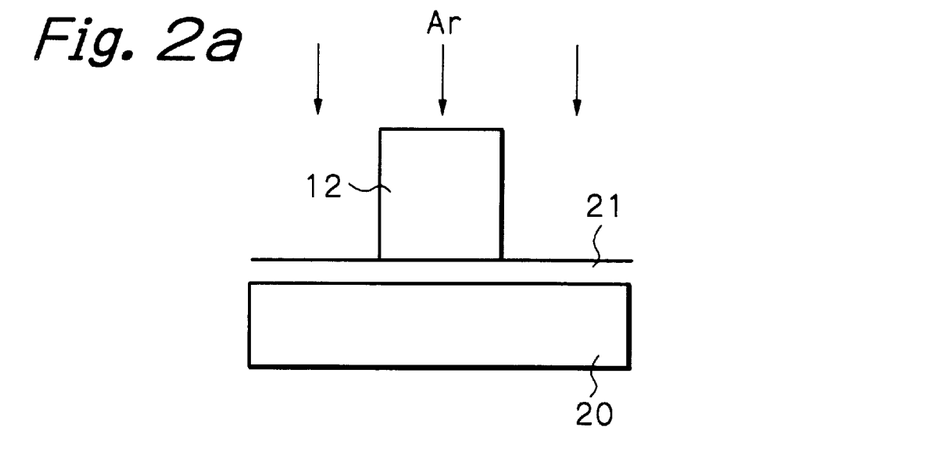
FIGS. 2a to 2c show sections viewed from the ABS schematically illustrating manufacturing processes of the magnetic head of the embodiment shown in FIG. 1.
Figure 2B:
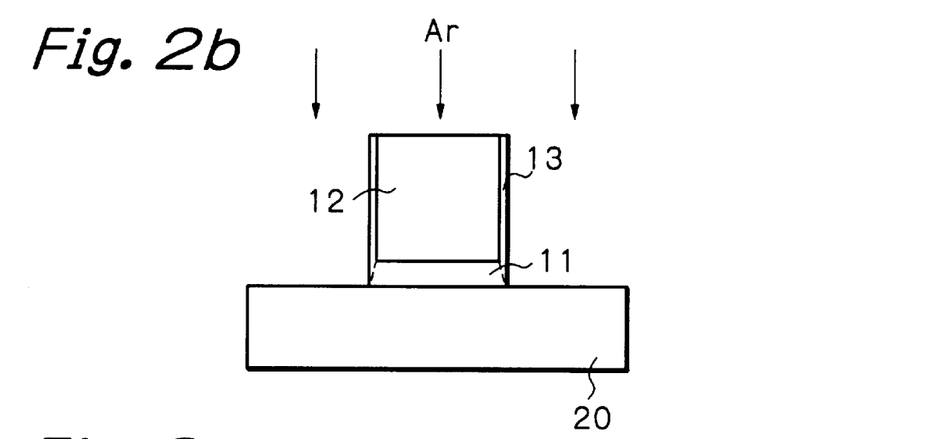
Figure 2C:
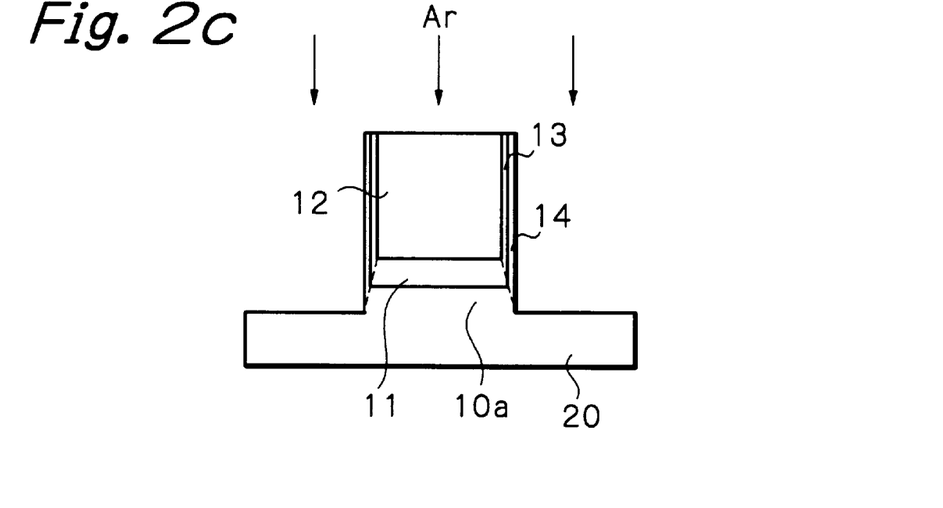

FIGS. 2a to 2c schematically illustrate manufacturing processes of the magnetic head of the embodiment shown in FIG. 1.

As shown in FIG. 2a, a nonmagnetic material layer 21, typically made of $Al_2O_3$, for the recording gap layer 11 is deposited on a magnetic material layer 20, typically made of Ni—Fe base alloy, for the lower magnetic pole layer 10. On the layer 21, the patterned upper magnetic pole layer 12 is formed. Then, using this upper pole layer 12 as a mask, ion milling process is executed. This ion milling process uses a downward beam of Ar ions directed substantially normal to the surface of the layer 21. The upper pole layer 12 may be plated by a magnetic material such as typically Ni—Fe alloy with usage a patterned resist layer, or may be formed by depositing a magnetic material layer made of typically Ni—Fe alloy and by patterning the deposited layer by ion milling.

As a result of the ion milling process using the upper pole layer 12 as a mask, a part of the nonmagnetic material layer 21 is removed to form the recording gap layer 11, as shown in FIG. 2b. At the same time, a part of the nonmagnetic material removed from the layer 21 is redeposited on side surfaces of the upper pole layer 12 and also on side surfaces of the recording gap layer 11 to form the nonmagnetic material side layers 13.

The ion milling process is kept on, and thus, as shown in FIG. 2c, a part of the magnetic material layer 20 is removed to form the lower magnetic pole layer 10 with the protruded portion 10a. Simultaneously, a part of the magnetic material removed from the layer 20 is redeposited on the nonmagnetic material side layers 13 and also on side surfaces of the protruded portion 10a of the lower pole layer 10 to form the magnetic material side layers 14.

Since the nonmagnetic material side layers 13 and the magnetic material side layers 14 used to greatly reduce the side fringe magnetic flux are made of redeposited materials which are necessarily generated in the ion milling processes for forming the lower pole layer 10 and the recording gap layer 11, no additional process is needed for forming this structure. Furthermore, since the redeposited materials are utilized as they are without adding a process for preventing the removed material to redeposit or without adding a process for removing the redeposited material, the manufacturing processes can be simplified.

Figure 3:
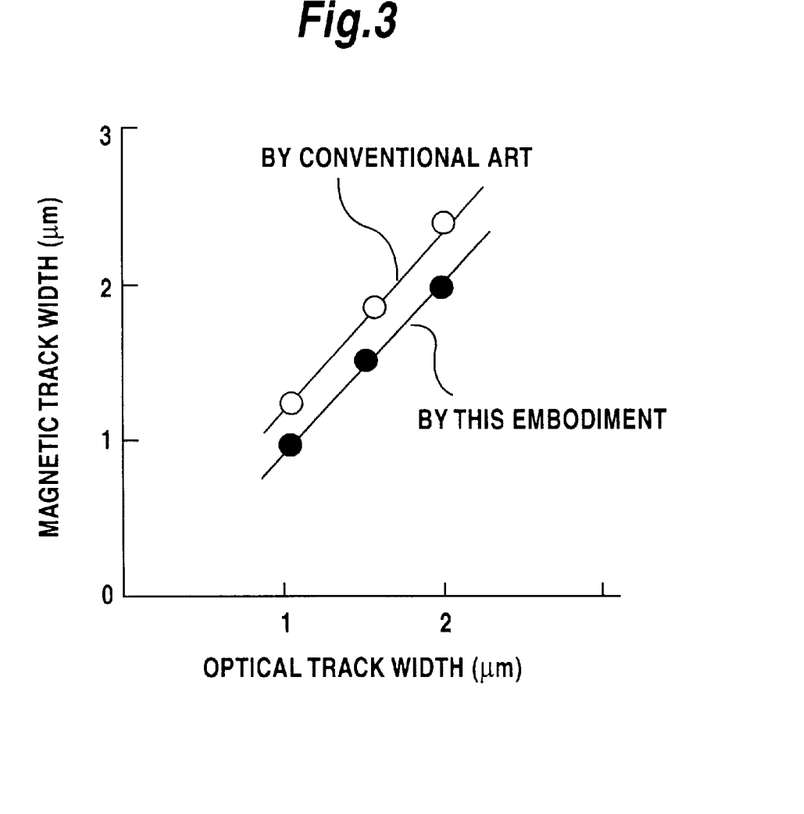
FIG. 3 shows a graph illustrating a relationship between optical track width and magnetic track width.

FIG. 3 represents a measured result with respect to magnetic effective track width of magnetic recording heads formed to have the optical track width of 1–2 $\mu$m according to the conventional art and to this embodiment. In the figure, the horizontal axis indicates the optical track width and the vertical axis indicates the magnetic track width.

As will be noted from the figure, in the magnetic recording heads according to the embodiment, the relationship between the optical track width and the magnetic track width is a direct proportional relationship expressed by a linear line, passing through the origin, with the inclination of 45 degrees. In other words, the magnetic track width increases by keeping substantially the same value as the optical track width.

Figure 4:
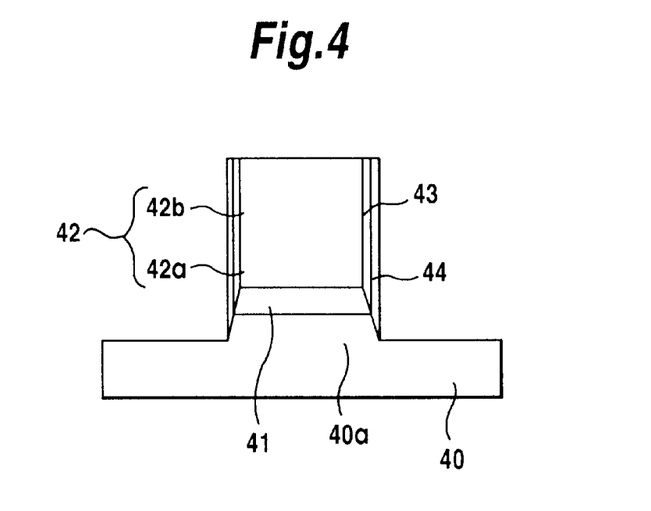
FIG. 4 shows a section viewed from the ABS schematically illustrating a multi-layered structure of a recording head part of a thin film magnetic head in another embodiment according to the present invention.

FIG. 4 schematically illustrates a multi-layered structure of a recording head part of a thin film magnetic head in another embodiment according to the present invention. Although the upper pole layer in the embodiment of FIG. 1 is constituted by a single magnetic material layer, an upper magnetic pole layer in this embodiment is constituted by a plurality of magnetic material layers (upper part layer and lower part layer).

In the figure, reference numeral 40 denotes a lower magnetic pole layer of the recording head part which also operates as an upper shield layer of the MR head part, 41 denotes a recording gap layer, and 42 denotes the upper magnetic pole layer, respectively. The upper pole layer 42 has a two-layered structure with a lower part layer 42a made of a magnetic material with a high saturation magnetic flux density used to improve the recording performance, and an upper part layer 42b made of the same magnetic material as that of the conventional magnetic poles.

The lower magnetic pole layer 40 has a shape, in the ABS plane, with a trapezoidal portion 40a protruded from an edge opposed to the upper magnetic pole layer 42 so that the lengths of the opposed edges in the ABS plane of the lower and upper poles are substantially the same or as close to each other as possible.

As shown in FIG. 4, on side surfaces of the upper pole layer 42 and also in some case on side surfaces of the recording gap layer 41, thin nonmagnetic material side layers 43 are formed. On the nonmagnetic material side layers 43 and also in some case on side surfaces of the protruded portion 40a of the lower pole layer 40, magnetic material side layers 44 are formed.

The nonmagnetic material side layers 43 are made of redeposited nonmagnetic material used to form the recording gap layer 41 and removed by ion milling. Also, the magnetic material side layers 44 are made of redeposited magnetic material used to form the lower pole layer 40 and removed by ion milling. Since the remaining structure of the composite type magnetic head is well known, further illustration is omitted in this specification.

The thickness of the nonmagnetic material side layer 43 is extremely thin in comparison with that of the recording gap layer 41, the thickness of the latter being typically about 0.25 $\mu$m. Thus, most of flux due to the strong magnetic field produced at both ends of the edge of the upper pole layer 42 passes through the nonmagnetic material side layers 43 and applied to the magnetic material side layers 44. Therefore, the side fringe magnetic flux leaked from the recording head part is extremely reduced. As a result, a effective increase of the recording track width due to the side fringe magnetic flux can be nearly prevented.

The thickness of each of the magnetic material side layers 44 is preferably 0.05–0.5 $\mu$m, more preferably 0.1–0.3 $\mu$m. If the thickness is less than 0.05 $\mu$m, effect for restraining the side fringe magnetic flux from occurring becomes lower. If the thickness is more than 0.5 $\mu$m, effective magnetic flux passing through the recording gap reduces causing the overwrite performance of the head to deteriorate.

The thickness of each of the nonmagnetic material side layers 43 is preferably ½ of the thickness of the recording gap layer 41 (recording gap length) or less, more preferably ⅓ of the thickness of the layer 41 or less. If this thickness is more than ½ of the thickness of the recording gap layer 41, effect for restraining the side fringe magnetic flux from occurring becomes lower.

Figure 5A:
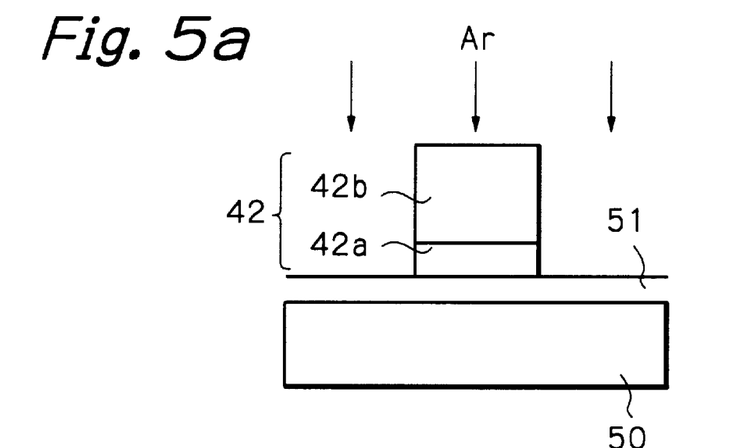
FIGS. 5a to 5c show sections viewed from the ABS schematically illustrating manufacturing processes of the magnetic head of the embodiment shown in FIG. 4.
Figure 5B:
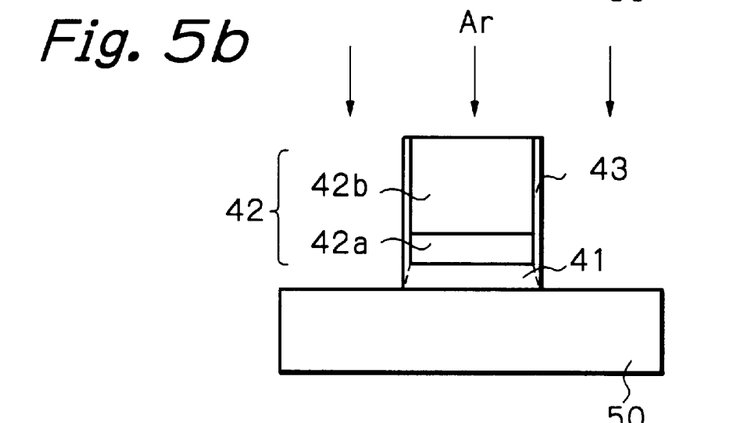
Figure 5C:
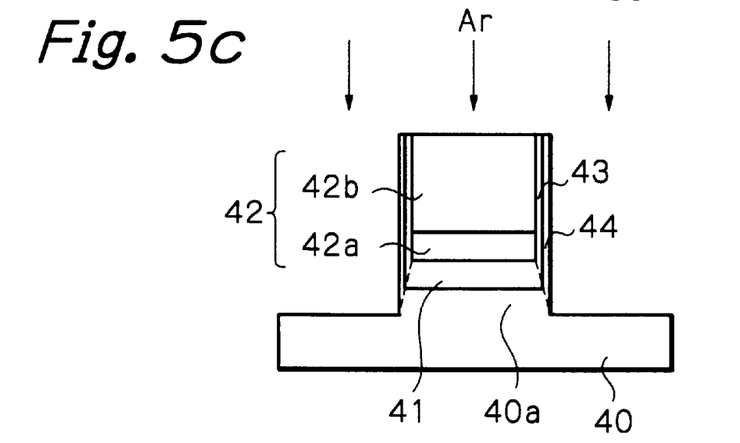

FIGS. 5a to 5c schematically illustrate manufacturing processes of the magnetic head of the embodiment shown in FIG. 4.

As shown in FIG. 5a, a nonmagnetic material layer 51, typically made of $Al_2O_3$, for the recording gap layer 41 is deposited on a magnetic material layer 50, typically made of Ni—Fe alloy, for the lower magnetic pole layer 40. On the layer 51, the patterned upper magnetic pole layer 42 is formed. Then, using this upper pole layer 42 as a mask, ion milling process is executed. This ion milling process uses a downward beam of Ar ions directed substantially normal to the surface of the layer 51. The upper pole layer 42 may be fabricated such that the lower part layer 42a is formed by depositing a layer made of a magnetic material with a high saturation magnetic flux density such as typically Co—Zr—Sn base alloy, Fe—Zr—N base alloy or Fe—Ta—C base alloy and by patterning, using a patterned resist mask, the deposited layer by ion milling, and that the upper part layer 42b is plated by a magnetic material such as typically Ni—Fe base alloy. The upper pole layer 42 may be fabricated by sequentially depositing these magnetic material layers and by patterning the deposited layers by ion milling to form the lower and upper part layers 42a and 42b.

As a result of the ion milling process using the upper pole layer 42 as a mask, a part of the nonmagnetic material layer 51 is removed to form the recording gap layer 41, as shown in FIG. 5b. At the same time, a part of the nonmagnetic material removed from the layer 51 is redeposited on side surfaces of the upper pole layer 42 and also on side surfaces of the recording gap layer 41 to form the nonmagnetic material side layers 43.

The ion milling process is kept on, and thus, as shown in FIG. 5c, a part of the magnetic material layer 50 is removed to form the lower magnetic pole layer 40 with the protruded portion 40a. Simultaneously, a part of the magnetic material removed from the layer 50 is redeposited on the nonmagnetic material side layers 43 and also on side surfaces of the protruded portion 40a of the lower pole layer 40 to form the magnetic material side layers 44.

Another advantages according to this embodiment is the same as that in the embodiment of FIG. 1.

Figure 6:
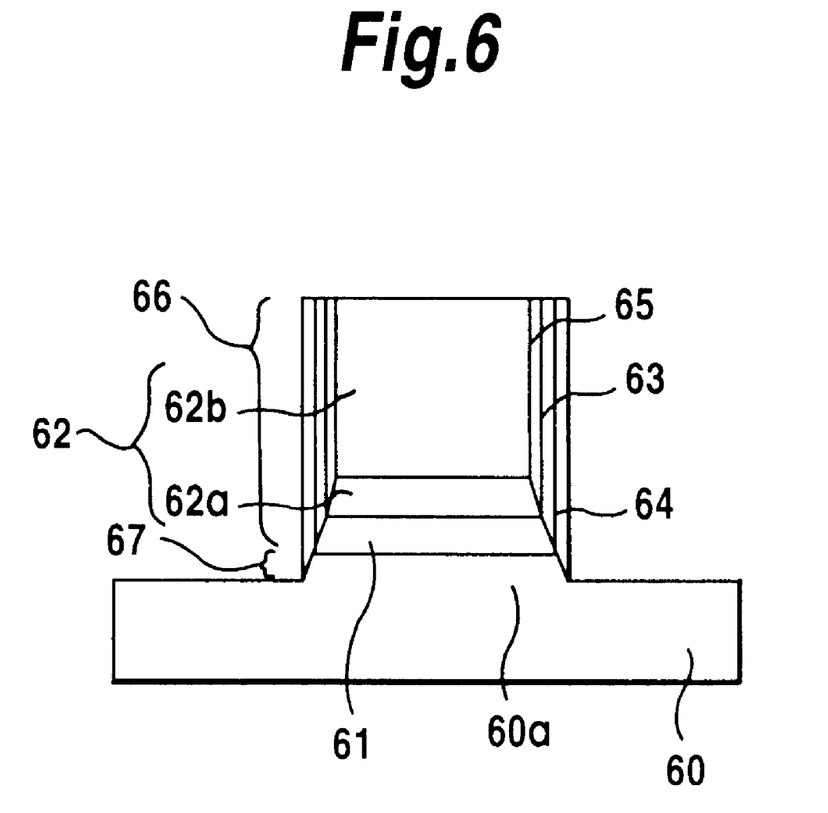
FIG. 6 shows a section viewed from the ABS schematically illustrating a multi-layered structure of a recording head part of a thin film magnetic head in a further embodiment according to the present invention.

FIG. 6 schematically illustrates a multi-layered structure of a recording head part of a thin film magnetic head in a further embodiment according to the present invention. In this embodiment also, an upper magnetic pole layer is constituted by a plurality of magnetic material layers (upper part layer and lower part layer).

In the figure, reference numeral 60 denotes a lower magnetic pole layer of the recording head part which also operates as an upper shield layer of the MR head part, 61 denotes a recording gap layer, and 62 denotes the upper magnetic pole layer, respectively. The upper pole layer 62 has a two-layered structure with a lower part layer 62a made of a magnetic material with a high saturation magnetic flux density used to improve the recording performance, and an upper part layer 62b made of the same magnetic material as that of the conventional magnetic poles.

The lower magnetic pole layer 60 has a shape, in the ABS plane, with a trapezoidal portion 60a protruded from an edge opposed to the upper magnetic pole layer 62 so that the lengths of the opposed edges in the ABS plane of the lower and upper poles are substantially the same or as close to each other as possible.

As shown in FIG. 6, on side surfaces of the upper pole layer 62, first magnetic material side layers 65 are formed. On the first side layers 65 and also in some case on side surfaces of the recording gap layer 61, thin nonmagnetic material side layers 63 are formed. On the nonmagnetic material side layers 63 and also in some case on side surfaces of the protruded portion 60a of the lower pole layer 60, second magnetic material side layers 64 are formed. The magnetic material side layer 64 has an upper part 66 and a lower part 67.

The nonmagnetic material side layers 63 are made of redeposited nonmagnetic material used to form the recording gap layer 61 and removed by ion milling. Also, the first magnetic material side layers 65 are made of redeposited magnetic material used to form the lower part layer 62a of the upper pole layer 62 and removed by ion milling, whereas the second magnetic material side layers 64 are made of redeposited magnetic material used to form the lower pole layer 60 and removed by ion milling. Since the remaining structure of the composite type magnetic head is well known, further illustration is omitted in this specification.

The thickness of the nonmagnetic material side layer 63 is extremely thin in comparison with that of the recording gap layer 61, the thickness of the latter being typically about 0.25 μm. Thus, most of flux due to the strong magnetic field produced at both ends of the edge of the upper pole layer 62 passes through the first magnetic material side layers 65 and the nonmagnetic material side layers 63, and applied to the second magnetic material side layers 64. Therefore, the side fringe magnetic flux leaked from the recording head part is extremely reduced. As a result, a effective increase of the recording track width due to the side fringe magnetic flux can be nearly prevented.

The thickness of each of the second magnetic material side layers 64 is preferably 0.05–0.5 μm, more preferably 0.1–0.3 μm. If the thickness is less than 0.05 μm, effect for restraining the side fringe magnetic flux from occurring becomes lower. If the thickness is more than 0.5 μm, effective magnetic flux passing through the recording gap reduces causing the overwrite performance of the head to deteriorate.

The thickness of each of the nonmagnetic material side layers 63 is preferably ½ of the thickness of the recording gap layer 61 (recording gap length) or less, more preferably ⅓ of the thickness of the layer 61 or less. If this thickness is more than ½ of the thickness of the recording gap layer 61, effect for restraining the side fringe magnetic flux from occurring becomes lower.

FIGS. 7a to 7d schematically illustrate manufacturing processes of the magnetic head of the embodiment shown in FIG. 6.

Figure 7A:
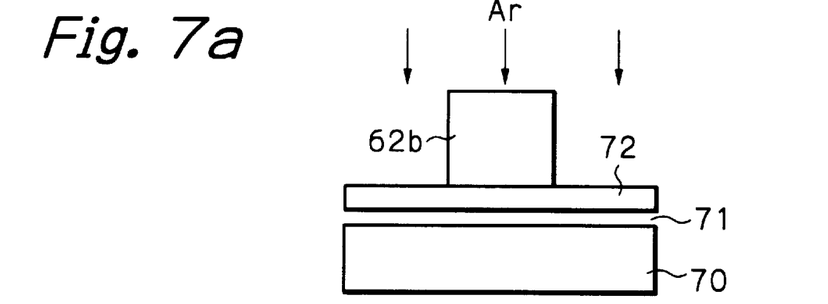
FIGS. 7a to 7d show sections viewed from the ABS schematically illustrating manufacturing processes of the magnetic head of the embodiment shown in FIG. 6.

As shown in FIG. 7a, a nonmagnetic material layer 71, typically made of $Al_2O_3$, for the recording gap layer 61 is deposited on a magnetic material layer 70, typically made of Ni—Fe alloy, for the lower magnetic pole layer 60. On the layer 71, a magnetic material layer 72 for the lower part layer 62a of the upper pole layer 62, made of a magnetic material with a high saturation magnetic flux density such as typically Co—Zr—Sn base alloy, Fe—Zr—N base alloy or Fe—Ta—C base alloy is formed by spattering. Then, on the layer 72, the patterned upper part layer 62b of the upper pole layer 62 is formed. Then, using this upper part layer 62b as a mask, ion milling process is executed. This ion milling process uses a downward beam of Ar ions directed substantially normal to the surface of the layer 72. The upper part layer 62b may be plated by a magnetic material such as typically Ni—Fe base alloy, or may be formed by depositing the magnetic material layer and by patterning the deposited layer by ion milling.

Figure 7B:
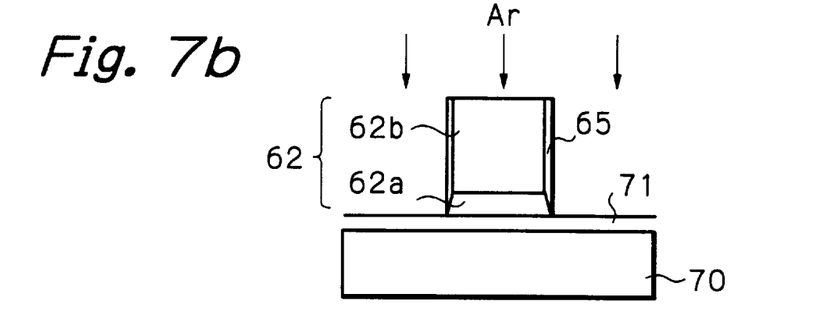

As a result of the ion milling process using the upper part layer 62b as a mask, a part of the magnetic material layer 72 is removed to form the lower part layer 62a of the upper pole layer 62, as shown in FIG. 7b. At the same time, a part of the magnetic material removed from the layer 72 is redeposited on side surfaces of the upper pole layer 62 to form the first magnetic material side layers 65.

Figure 7C:
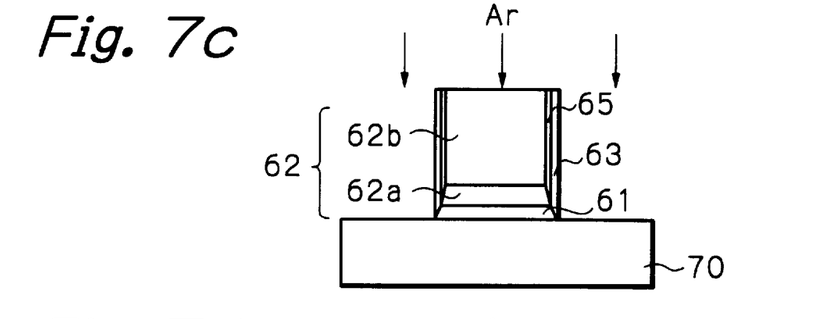

The ion milling process is kept on, and thus, as shown in FIG. 7c, a part of the nonmagnetic material layer 71 is removed to form the recording gap layer 61. At the same time, a part of the nonmagnetic material removed from the layer 71 is redeposited on the first magnetic material layer 65 and also on side surfaces of the recording gap layer 61 to form the nonmagnetic material side layers 63.

Figure 7D:
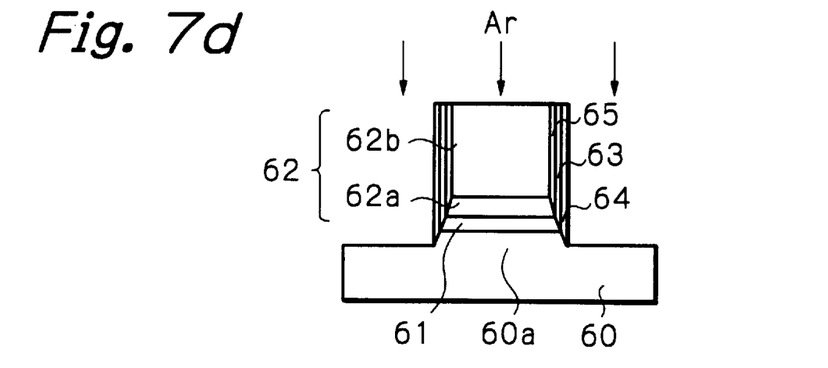

The ion milling process is further kept on and thus, as shown in FIG. 7d, a part of the magnetic material layer 70 is removed to form the lower magnetic pole layer 60 with the protruded portion 60a. Simultaneously, a part of the magnetic material removed from the layer 70 is redeposited on the nonmagnetic material side layers 63 and also on side surfaces of the protruded portion 60a of the lower pole layer 60 to form the second magnetic material side layers 64.

Another advantages according to this embodiment is the same as that in the embodiment of FIG. 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin film magnetic head comprising:
   a recording gap layer made of a nonmagnetic material:
   lower and upper magnetic pole layers made of a magnetic material, said lower and upper magnetic pole layers sandwiching said recording gap layer, wherein said lower magnetic pole layer has a protruded portion having at least a lateral side, wherein said protruded portion protrudes from an edge of said lower magnetic pole layer facing said upper magnetic pole layer and attaches to said recording gap layer;

a nonmagnetic material side layer deposited on at least a part of a side surface of said upper magnetic pole layer, wherein the nonmagnetic material side layer is deposited on a side surface of said recording gap layer; and a magnetic material side layer having an upper part and a lower part joined together, with said upper part deposited on said nonmagnetic material side layer and said lower part deposited on said lateral side of said protruded portion, wherein said lower part extends to the edge of the lower magnetic pole layer adjacent to said protruded portion.

2. The head as claimed in claim 1, wherein said nonmagnetic material side layer has a thickness thinner than that of said recording gap layer.

3. The head as claimed in claim 1, wherein said nonmagnetic material side layer is made of redeposited nonmagnetic material which is used to form said recording gap layer.

4. The head as claimed in claim 1, wherein said magnetic material side layer is made of redeposited magnetic material which is used to form said lower magnetic pole layer.

5. The head as claimed in claim 1, wherein said upper magnetic pole layer is constituted by a single magnetic material layer.

6. The head as claimed in claim 1, wherein said upper magnetic pole layer is constituted by a plurality of stacked magnetic material layers.

7. A thin film magnetic head comprising:

a recording gap layer made of a nonmagnetic material:

lower and upper magnetic pole layers made of a magnetic material, said lower and upper magnetic pole layers sandwiching said recording gap layer, wherein said lower magnetic pole layer has a protruded portion, wherein said protruded portion protrudes from an edge of said lower magnetic pole layer facing said upper magnetic pole layer and attaches to said recording gap layer, wherein said upper magnetic pole layer comprises a plurality of stacked magnetic material layers;

a first magnetic material side layer deposited on at least a part of a side surface of at least said upper magnetic pole layer;

a nonmagnetic material side layer deposited on at least a part of said first magnetic material side layer; and a second magnetic material side layer having an upper part and a lower part joined together, with said upper part deposited on at least a part of said nonmagnetic material side layer and said lower part deposited on at least a part of a side of said protruded portion.

* * * * *